Figure 14:
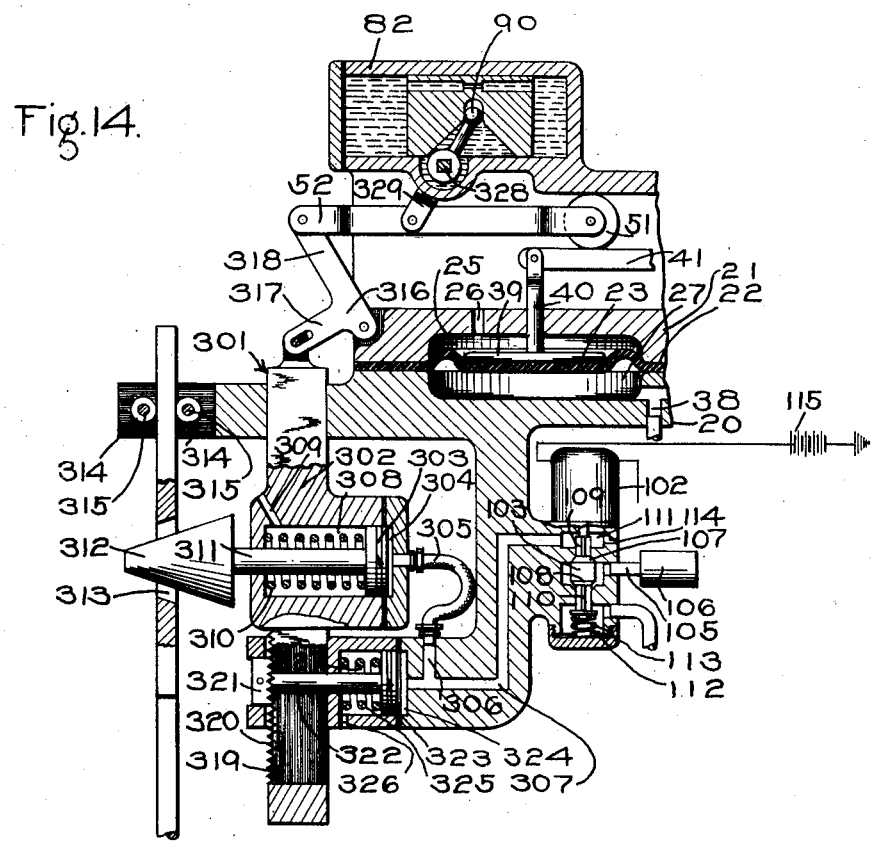

March 8, 1938.  C. C. FARMER  2,110,704
VARIABLE LOAD BRAKE
Filed June 10, 1937   5 Sheets-Sheet 1
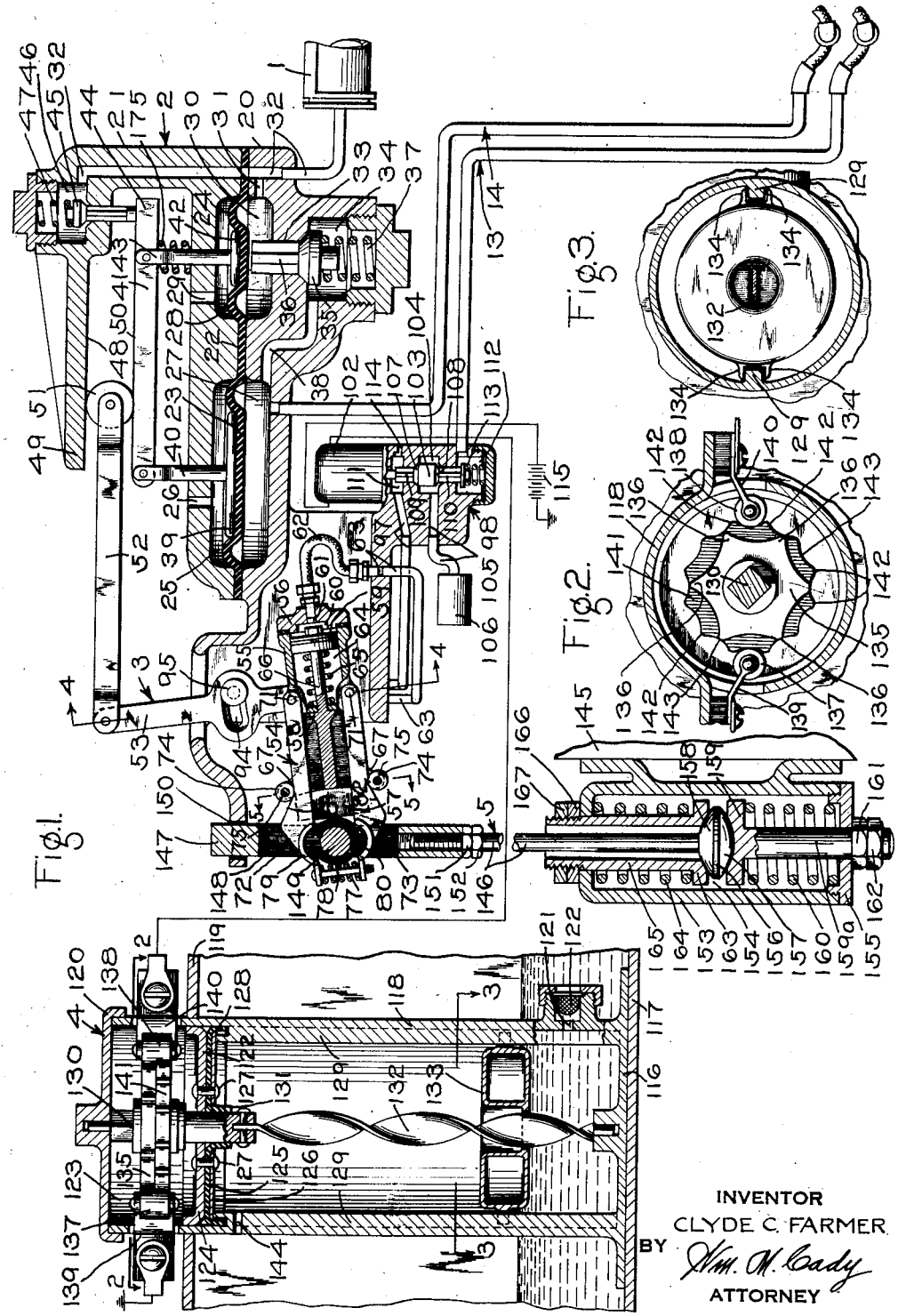
INVENTOR
CLYDE C. FARMER
BY Wm. W. Cady
ATTORNEY March 8, 1938.  C. C. FARMER  2,110,704
VARIABLE LOAD BRAKE
Filed June 10, 1937    5 Sheets-Sheet 2
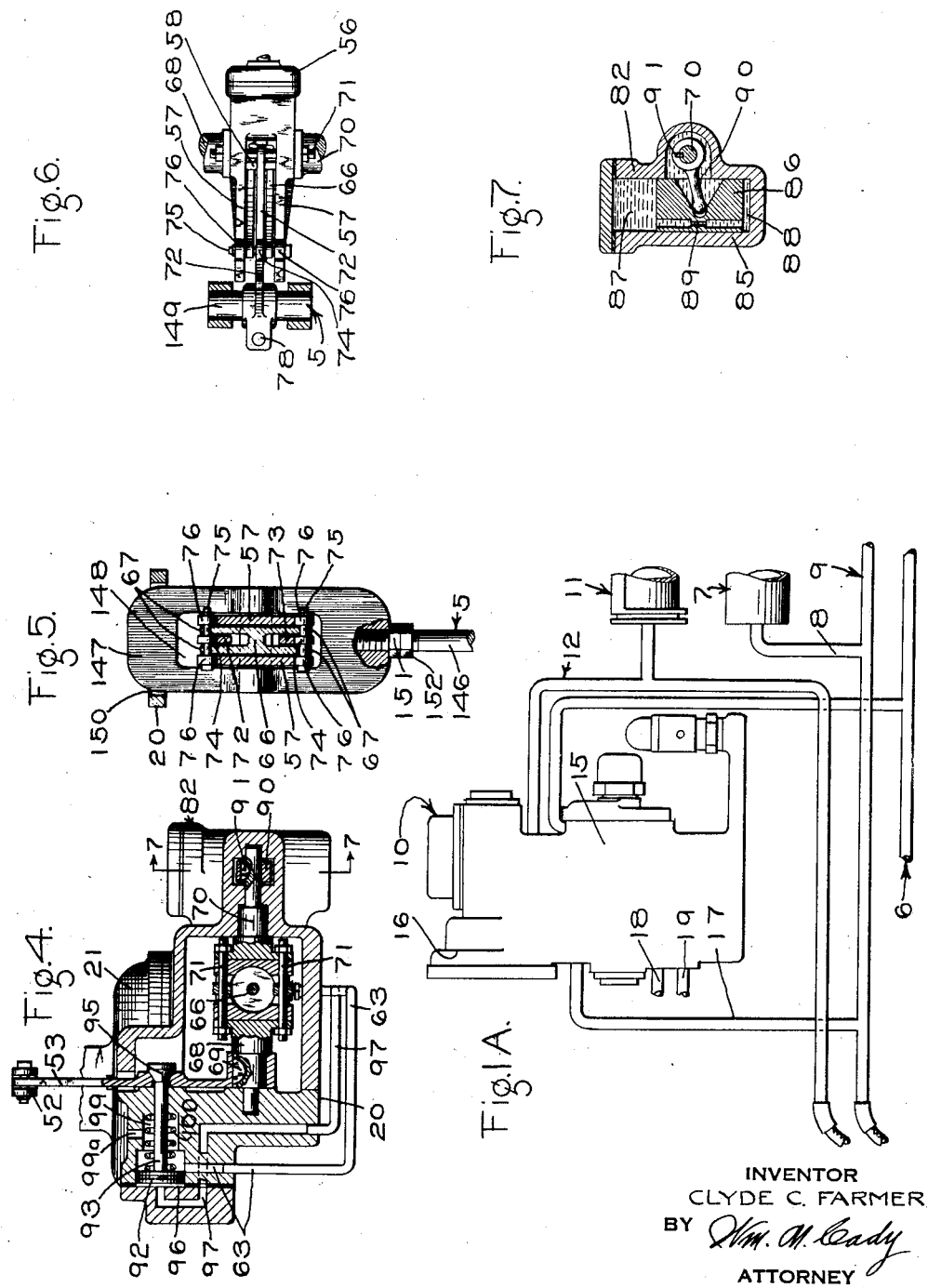
INVENTOR
CLYDE C. FARMER
BY Wm. M. Cady
ATTORNEY March 8, 1938. C. C. FARMER 2,110,704
VARIABLE LOAD BRAKE
Filed June 10, 1937 5 Sheets-Sheet 3
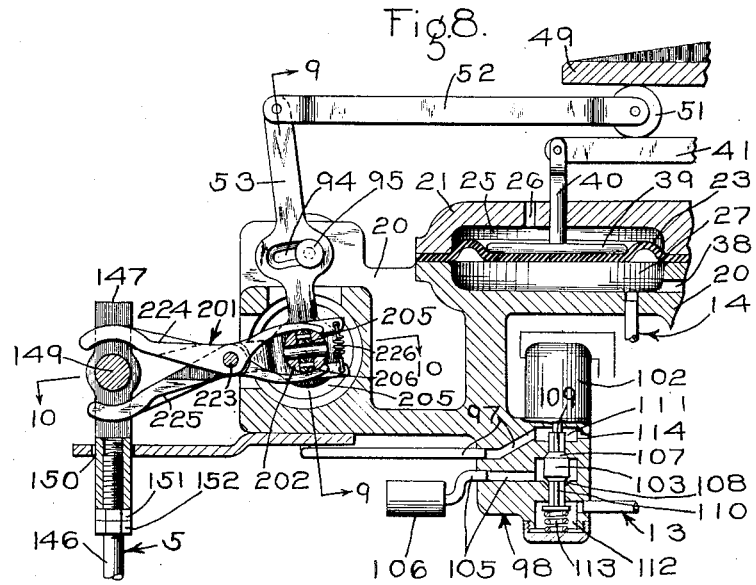
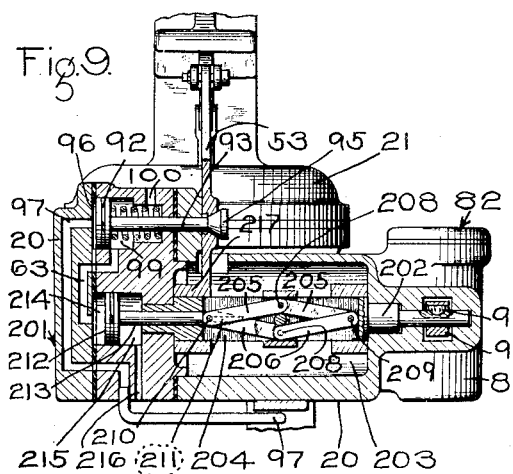
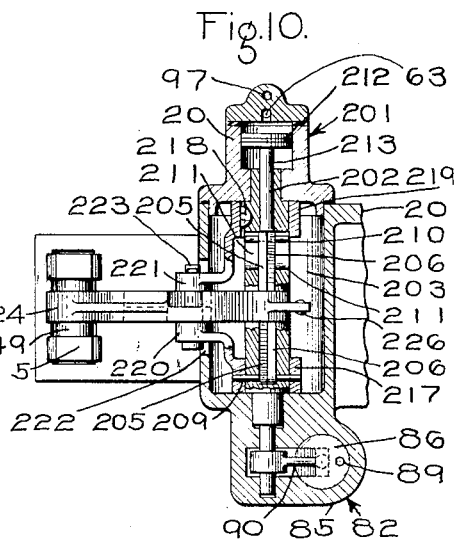
INVENTOR
CLYDE C. FARMER.
BY Wm. M. Cody
ATTORNEY

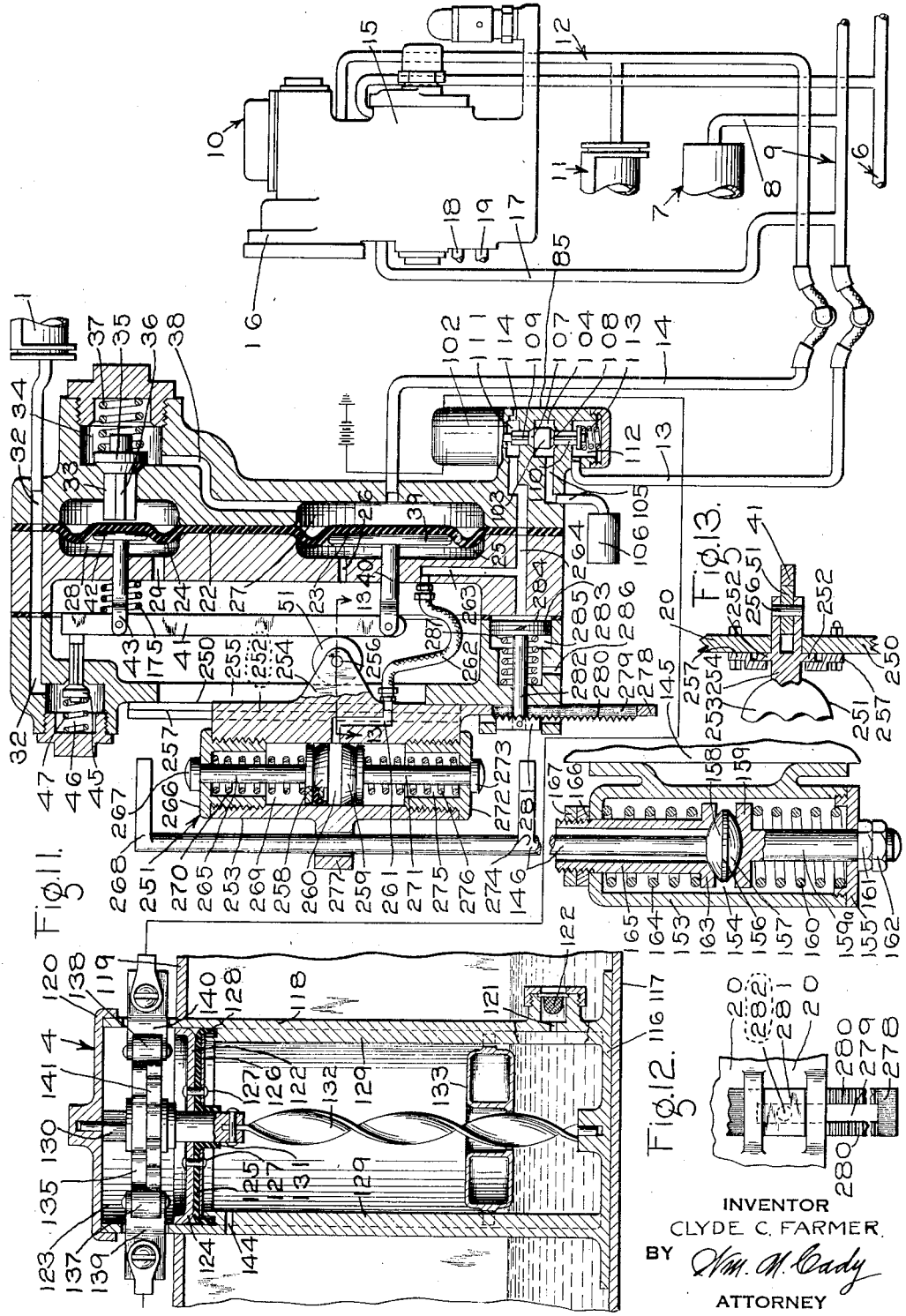

March 8, 1938.  C. C. FARMER  2,110,704
VARIABLE LOAD BRAKE
Filed June 10, 1937   5 Sheets-Sheet 5

INVENTOR
CLYDE C. FARMER
BY Wm. M. Cady
ATTORNEY

Patented Mar. 8, 1938

2,110,704

UNITED STATES PATENT OFFICE 2,110,704

VARIABLE LOAD BRAKE

Clyde C. Farmer, Pittsburgh, Pa., assignor to The Westinghouse Air Brake Company, Wilmerding, Pa., a corporation of Pennsylvania Application June 10, 1937, Serial No. 147,445

46 Claims. (Cl. 303—22)

This invention relates to variable load brake equipment for vehicles and more particularly for railway vehicles.

The principal object of the invention is to provide a variable load brake equipment for that type of vehicle, such for instance as the locomotive tender, in which the body thereof is adapted to carry at the same time a plurality of kinds of lading which are separated from each other by a suitable partition wall or walls, and in which at least one of said kinds of lading may at intervals be increased or decreased in both amount and weight at a rate faster than another.

In operating trains, it is the practice to fully load the locomotive tender with both fuel and water preparatory to starting on a run, the amount of water carried being three or four times greater than the full load of fuel. During a run the rate at which the water is used greatly exceeds that of the consumption of the fuel, so that the greatest and most rapid variation in the total weight of the load carried by the tender is due to the variations in the water load. If the run is long, the water compartment may have to be refilled two or three times to one filling of the fuel compartment, which refilling is usually accomplished while the train is in motion by means of a scoop which is lowered from the tender into a water supply contained in a trough located between the track rails. The fuel compartment cannot be refilled while the train is in motion, so that the weight of the fuel load will continue to reduce until the end of the run is reached, and since the reduction in the fuel load is very gradual and substantially continuous and the water load is alternately decreased and increased several times during a long run it is very desirable to brake the tender according to variations in the total weight of the lading carried rather than according to the maximum total weight of the lading as is now the practice.

It will be apparent that in a tender where the braking power is not varied according to variations in the weight of the lading but is based upon the maximum total weight thereof, such braking power will be entirely too great when the water supply is low and when both the water and fuel supply are low. When this condition exists, the excessive braking power contributes to several undesirable braking characteristics among which may be mentioned the locking and consequent sliding of the tender wheels, excessive run out shocks caused by the locomotive and excessive run-in of slack caused by the cars coupled to the tender.

Another object of the invention is to provide a variable load brake mechanism for vehicles of the hereinbefore mentioned type which is operable to vary the braking power according to variations in the total weight of the different kinds of lading carried and which is conditioned or adjusted according to the variations in the amount of one of said kinds of lading relative to the other.

Another object of the invention is to provide a vehicle variable load brake mechanism which is operable according to variations in the weight of the vehicle to vary the braking power and which is especially adapted for use in tenders or other vehicles in which a plurality of kinds of ladings are carried and in which the weight of one kind of lading is adapted to be decreased and increased relative to the other.

Another object of the invention is to provide a variable load brake mechanism for locomotive tenders which is adapted to vary the braking power according to the variations in the total weight of the water and fuel carried and which is conditioned or adjusted according to variations in the amount of water carried.

A further object of the invention is to provide a variable load brake mechanism for locomotive tenders which is adapted to vary the braking power according to the total weight of the water and fuel carried and which is conditioned or adjusted according to the variations in the level of the water carried.

Other objects and advantages will appear in the following more detailed description of the inventions.

In the accompanying drawings Figs. 1 and 1A when placed end-to-end show diagrammatically a tender and locomotive brake equipment embodying the invention, the tender variable load brake mechanism shown in Fig. 1 being mainly in section; Figs. 2 and 3 are fragmentary horizontal sectional views taken on the lines 2—2 and 3—3, respectively, of Fig. 1; Figs. 4 and 5 are fragmentary vertical sectional views taken on the lines 4—4 and 5—5, respectively, of Fig. 1; Fig. 6 is a plan view of a portion of the mechanism, one member of the mechanism being shown in section; and Fig. 7 is a fragmentary vertical sectional view taken on the line 7—7 of Fig. 4 and shows a dash pot device which is embodied in the mechanism; Fig. 8 is a fragmentary diagrammatic view, mainly in section, of another form of the tender variable load brake mechanism; Fig. 9 is a fragmentary vertical sectional view of the same taken on the line 9—9 of Fig. 8 and Fig. 10 is a fragmentary horizontal sectional view taken on the line 10—10 of Fig. 8; Fig. 11 is a diagrammatic view of a locomotive and tender brake equipment embodying another form of the invention, the tender variable load brake mechanism being largely shown in section; and Fig. 12 is a fragmentary elevational view of a locking means embodied in the mechanism; and Fig. 13 is a fragmentary horizontal sectional view taken on the line 13—13 of Fig. 11. Fig. 14 is a fragmentary diagrammatic view, mainly in section, of another form of the variable load brake mechanism.

The tender brake equipment, as shown in Fig. 1 of the accompanying drawings, may comprise a brake cylinder 1, a combined application and release valve device 2, an adjusting mechanism 3 operative to condition the valve device 2, a control mechanism 4 operative according to variations in the level of the water carried by the tenders for effecting the operation of the adjusting mechanism 3, and a strut device 5 for regulating the operation of the control mechanism 4 according to the total weight of both the fuel and water carried by the tender.

The locomotive brake equipment, as shown in Fig. 1A, comprises a brake pipe 6, a main reservoir 7 which is connected through a branch pipe 8 to a main reservoir pipe 9, a distributing valve device 10, a brake cylinder 11, and a brake cylinder pipe 12. The main reservoir pipe 9 and brake cylinder pipe 12 are connected to pipes 13 and 14, respectively, forming part of the tender fluid pressure brake equipment as will hereinafter more fully appear. The brake pipe 6 extends from end-to-end of the tender and is connected to the brake pipe on the locomotive in the usual manner, but since that portion of the brake pipe carried by the tender has no bearing upon the operation of the tender fluid pressure brake equipment it has been omitted from Fig. 1.

The distributing valve device 10 which is shown in both Figs. 1A and 11 is of the well known type employed in the 6ET locomotive brake equipment and has been shown for illustrative purposes only. This valve device comprises an equalizing portion 15 and an application portion 16 which are operative upon a reduction in brake pipe pressure to supply fluid under pressure from a main reservoir branch pipe 17 to the brake cylinder pipe 12. Connected to the valve device are the usual application cylinder pipe 18 and distributing valve release pipe 19. Since the construction and operation of the device is well known it has been shown in outline to simplify the drawings.

The control valve device 2 may comprise a casing 20 having a cap 21 secured thereto in any desired manner. Between the casing and cap there is clamped a gasket 22 having laterally spaced flexible diaphragms 23 and 24, the area of the diaphragm 23 being greater than that of the diaphragm 24.

At one side of the diaphragm 23 is a chamber 25 which is connected through a passage 26 to the atmosphere, and at the other side is a chamber 27 which is constantly connected to the pipe 14, which pipe, as has been hereinbefore mentioned, is connected to the locomotive brake cylinder pipe 12.

At one side of the smaller diaphragm 24 is a chamber 28 which is connected through a passage 29 to the atmosphere, and at the other side is a chamber 30 which is connected through a passage 31 and a passage and pipe 32 to the tender brake cylinder 1. This chamber 30 is connected to a passage 33 leading to a chamber 34 containing a supply valve 35 which, as will hereinafter more fully appear is operative to control the supply of fluid under pressure to the brake cylinder 1. The supply valve is provided with a fluted stem 36 which extends into the chamber 30 and which is adapted to be operatively engaged by the diaphragm 24. Contained in the chamber 34 is a spring 37 which, at all times, tends to urge the valve 35 toward its seat. The valve chamber 34 is connected through a passage 38 to the diaphragm chamber 27.

Contained in the diaphragm chamber 25 and operatively engaged by the diaphragm 23 is a follower 39 having a stem 40 which extends through an opening provided in the cap 21 and which at its outer end is pivotally connected to one end of a control beam or lever 41. Contained in the diaphragm chamber 28 is a follower 42 having a stem 43 which extends through an opening provided in the cap 21 and which at its outer end is pivotally connected to the lever 41 at a point located a short distance from its other end to provide an arm 44 which, as will hereinafter more fully appear, is operative to control the operation of a brake cylinder exhaust valve 45 contained in the chamber 46 connected to the brake cylinder passage 32, said valve being constantly urged toward its seat by the action of a spring 47 contained in valve chamber 46.

Interposed between and operatively engaging the inner face 48 of a flange 49 with which the cap 21 is provided and the adjacent upper edge face 50 of the lever 41 is a fulcrum member 51 which is shiftable through the medium of the mechanism 3, back and forth along the lever to various positions between the follower stems 40 and 43 according to variations in the load carried by the tender.

As shown the mechanism 3 may comprise an operating link 52 which is pivotally connected at one end to the fulcrum member 51 and which is pivotally connected at its other end to the outer end of a rockable lever 53, which lever has its inner end secured to a fluid pressure controlled cylinder device 54 pivotally mounted in the casing section 21.

The cylinder device 54 comprises a casing having a cylinder 55 to one end of which is secured, in any desired manner, a pressure head 56. The other or open end of the cylinder casing is provided with longitudinally extending laterally spaced parallel arms 57 which, as shown in the present embodiment of the invention, may be integral with the cylinder casing.

Extending laterally between and integrally connected to the arms 58, at a point located adjacent the open end of the cylinder casing, is a substantially vertically disposed web 58.

Contained in the cylinder casing is a reciprocal piston 59 at one side of which is a chamber 60 which is connected through a passage 61 and a flexible conduit 62 to a fluid pressure supply and exhaust passage and pipe 63. At the other side of the piston is a chamber 64 which is open to the atmosphere and which contains a return spring 65 interposed between and engaging the web 58 and the non-pressure face of the piston 59. This piston is provided with a stem 66 which extends through a central opening in the web 58 and beyond the web is provided with upper and lower pairs of spaced ears 67, the web constituting a guide for the piston stem as well as a spring seat for the spring 65 and a stop for limiting the return movement of the piston stem.

The outer end portion of the piston stem, i. e., that portion which is provided with the ears 67, is guided against lateral or axial rotary movement by the arms 57 of the cylinder portion as is best shown in Fig. 5.

The cylinder casing 55 adjacent its outer end is provided, at one side, with a laterally extending trunnion 68 which is journaled in the casing 20 and to which the lower end of the lever 53 is secured by means of a key 69. At the opposite side of the cylinder casing is a trunnion 70 which is arranged in axial alignment with the trunnion 68 and which is journaled in the casing 20. In the present embodiment of the invention these trunnions are made separate from the cylinder portion and are clamped thereto by means of bolts 71.

Arranged between the upper and lower spaced ears 67 and extending parallel therewith are spaced upper and lower jaw members 72 and 73, respectively, which are pivotally mounted at their inner ends on the bolts 71. At the end of the piston stem, the outer edge faces of each jaw member is engaged by a roller 74 which is rotatably mounted on a pin 75 extending transversely of and carried by the spaced ears 67. Rotatably mounted on each end of each pin 75 is a roller 76 which engages the adjacent edge face of an arm 57. The arms 57 cooperate with the rollers 76 on both pins 75 to guide the extreme outer end of the piston stem 66 against upward or downward movement relative to the cylinder portion.

The jaw members 72 and 73 extend a short distance beyond the outer end of the arms 57 and between their outer ends there is interposed a spring 77 which acts to normally force the jaw members apart and thereby maintain them in close engagement with the upper and lower rollers 74, said spring being maintained in position between the jaw members by means of a substantially vertically disposed pin 78 carried by the jaw members.

The outer end portion of the jaw member 72 is provided with a substantially semi-circular lower bearing surface 79 and the corresponding end portion of the jaw member 73 is provided with a similar bearing surface 80, both of which surfaces, as will be presently described, is adapted to cooperate with the strut mechanism 5 to effect the proper adjustment of the control mechanism. To the right of these semi-circular bearing faces, as viewed in Fig. 1, the outer end portion of the jaw members 72 and 73 are provided with sloping faces 81 and 82, respectively, which, in a direction toward the outer ends of the jaw members, diverge from each other as shown in Fig. 1.

For the purpose of snubbing or dampening any sudden rocking action of the cylinder mechanism 54 a double acting dash pot device 82 is provided. This device may comprise a cylinder casing 85 in which there is mounted a reciprocal snubbing piston 86 having a chamber 87 at one end and a chamber 88 at the other end, which chambers are filled with any desired non-freezing liquid and which are connected together through a restricted passage 89 extending longitudinally through the piston. The piston is operatively connected to an arm 90 which is secured to the trunnion 70 of the cylinder mechanism by means of a key 91.

For a purpose of locking the mechanism in any adjusted position a locking arrangement is provided which may comprise a reciprocal piston 92 which is slidably mounted in the casing 20. This piston is provided with a stem 93 which extends through an arcuate slot 94 provided in the lever 53 intermediate its ends, the edge of the slot on the outer face of the lever being beveled to form a friction locking surface which is adapted to be engaged by a wedge shaped or conical locking member 95 carried by the outer end of the piston stem 93.

At one side of the piston 92 is a chamber 96 which is connected through a passage and pipe 97 to a magnet valve device 98 which will be described later, and at the other side is a chamber 99 which is constantly connected through a passage 99a to the atmosphere and which is normally connected to passage 63. Contained in chamber 99 is a spring 100 which acts, through the medium of the piston 92 and piston stem 93 to normally maintain the locking member 95 in locking engagement with the lever 53 as shown in Fig. 4.

The magnet valve device 98 is provided for the purpose of controlling the operation of the piston 92 and comprises an electromagnet 102 which is operative to control the operation of a double seating valve member 103 contained in a chamber 104 which is connected through a passage and pipe 105 to a timing reservoir 106. This valve member comprises valves 107 and 108 having fluted stems 109 and 110, respectively. The fluted stem 109 extends through a communication from the valve chamber 104 to a chamber 111, which communication is controlled by the valve 107. The fluted stem 110 extends through a communication from valve chamber 104 to a chamber 112 which is connected through pipe 13 to the main reservoir pipe 9 on the locomotive and which contains a spring 113, which spring, at all times, tends to shift the valve member 103 in the direction to seat the valve 107. The chamber 104 is connected to the atmosphere through a restricted passage 114 and is also connected to the passage 97 leading to the piston chamber 96.

For the purpose of controlling the operation of the magnet valve device an automatically controlled electric circuit system is provided which comprises an electric circuit including a source of electric energy, such as a battery 115, the winding of the magnet valve device 98, the control switch device 4 and the wires for connecting these parts in circuit.

The control switch device 4 comprises a casing having a base portion 116 which in the present embodiment of the invention rests on the bottom wall 117 of the water compartment of the tender. The casing further comprises a vertically disposed tubular portion 118 which is preferably integral with and extends upwardly from the base portion 116. The upper end of the portion 118 may extend through the top wall 119 of the water compartment and may be closed exteriorly of such compartment by a removable cap 120. Adjacent the base portion 116 the tubular portion 118 is provided with a passage 121 of relatively small diameter through which the interior of this portion of the casing is in constant open communication with the water compartment, there being a strainer 122 interposed between the water compartment and the passage which is adapted to prevent large particles of dirt or other foreign matter from being carried into the interior of the tubular portion by the water from the water compartment.

Contained in the tubular portion 118 and located a short distance below the top thereof is a partition 122 which is adapted to prevent water below the partition from entering a switch chamber 123 which is defined by the casing, cap 120 and partition. In the present embodiment of the invention this partition 122 is shown as comprising a pan shaped annular plate 124 which has a press fit with the inner surface of the tubular portion 118 and further comprises an annular packing member 125 which is clamped to the underside of the plate 124 by means of a plate 126 and rivets 127 and which is provided with an outer peripheral downwardly extending flange or skirt 128 which closely engages the inner surface of the portion 118 to form a water tight seal around the periphery of the partition. The partition assembly when properly positioned as shown in Fig. 1 is supported against downward movement by the upper ends of vertically disposed ribs 129 which are formed integral with the tubular portion 118 and which are arranged interiorly thereof.

Located centrally of the tubular portion 118 and extending vertically for substantially the full height thereof is a rotatable member 130 which is journaled at one end in the cap 12 and at the other end in the base portion 116 of the casing. Intermediate its ends this member is journaled in the plate 124 and is closely engaged by a downwardly extending annular flange 131 of the packing member 125, which flange prevents water beneath the partition from entering the chamber 123 by way of any clearance space between the plate 124 and the member 130.

Below the partition assembly, the member 130 is made in the form of a spiral 132 on which there is slidably mounted a hollow air tight float 133 which is adapted to float on the surface of the water in the tubular portion and to move vertically therewith as the level of the water changes. Projecting outwardly from the periphery of the float are two pairs of vertically extending laterally spaced guide lugs 134, the lugs of each pair being adapted to slidably engage opposite sides of the adjacent vertically disposed rib 129 of the tubular portion 118 of the casing. By reason of such engagement rotary movement of the float is positively prevented so that as the float moves vertically it will cause the member 130 to rotate in one direction or another depending upon whether the movement is downwardly or upwardly.

Arranged within the chamber 123 and secured to the member 130 so as to rotate therewith is a metallic contact member 135 having a plurality of radially disposed peripheral contact points 136 which are adapted to be engaged by contact rollers 137 and 138 carried by light leaf springs 139 and 140, respectively, which act to constantly urge the rollers toward the member and which form connections from the rollers to the circuit wires. These contact points 136 are so arranged that when the contact roller 137 engages one of them, the roller 138 will engage another one so as to close the circuit through the battery 115 and the winding of the magnet valve device 89.

Located at one side of the contact member and secured to the member 130 so as to rotate therewith is a member 141 which is made of material that will not conduct electricity. The periphery of this member is adapted to engage the rollers 137 and 138 and is provided with alternately arranged projections and depressions 142 and 143, respectively, to produce a snap action of the member in either opening or closing the circuit.

It will be noted from an inspection of Fig. 2 of the drawings that there are twice as many projections 142 of the member 141 as there are contact points 136 on the member 135, and since these projections and contact points are radially arranged there will be a depression 143 at each contact point 136 a projection 142 on each side of each contact point and a depression 143 between each two contact points. The depressions at the contact points permit the rollers to engage said points. Between the contact points the contact member is so shaped that when the contact rollers are in any one of the recesses 143 between the contact points the member 141 will prevent the rollers from moving into contact with the member 135. From this it will be seen that when the contact rollers are in any of the recesses 143 at the ends of the contact points 136 such points and rollers are in engagement and the circuit through the battery 115 and winding in the magnet valve device will be closed and that when the rollers are in any of the other recesses 143 they will be held out of contact with the member 135 and the circuit will be open.

Below the partition 122 the tubular portion 118 is provided with a passage 144 which connects the interior of such portion to the water compartment of the tender. This passage is located so that it will be above the highest level reached by the water in the water compartment and is for the purpose of permitting the escape of air from the interior of the portion 118 when the water compartment is being filled and for permitting the entrance of air when the water is being used. This permits the level of the water in the portion 118 to freely rise or fall with any rise or fall in the level of the water in the water compartment, which would not be possible if the space between the surface of the water and the partition 122 were air tight.

The control valve device 2, control mechanism 3 and switch device 4 are carried by the body of the tender and since the body is supported in the usual manner by the truck springs, the body and these several parts of the variable load brake equipment are movable vertically relative to the wheels and other fixed parts of the truck upon variation in the weight of the lading carried by the body.

The strut device 5 is provided for the purpose of regulating the adjustment of the control mechanism according to the weight of the load carried by the body of the tender and is carried by a fixed truck part 145, such for instance as a spring plank or any other suitable fixed part of the truck frame.

As shown, the strut device is vertically disposed and may comprise a strut rod 146 which is supported at its lower end from the fixed part 145 of the strut. Adjustably secured to the upper end of the strut rod 146 and extending upwardly therefrom is a stop member 147 having an opening 148 through which the outer end portions of the jaw members 72 and 73 extend. Secured to the jaw member and extending across the opening and between the surfaces 79 and 80 of the jaw members is a stop 149 which, as will hereinafter more fully appear, is adapted to be engaged by the jaw members. The upper end of the stop member 147 extends through an opening 150 in the casing 20. This provides a lost motion connection between the casing 20 and the strut mechanism which permits the casing to freely move upwardly or downwardly relative to the strut. The dimensions of the opening 150 are such that there will be sufficient clearance between the casing and the strut members to permit the strut rod 146 and locking member 147 to freely move at an angle from its normal vertical position when the truck is passing around a curve in the track and yet will not be sufficient to permit the strut rod and locking member to move out of cooperative relationship with the cylinder device 54.

The stop member 147 is held in its proper adjusted position with relation to the strut rod 146 by means of a nut 151 and a check nut 152 which has screw threaded connection with the strut rod.

In the present embodiment of the invention the mounting for the strut rod 146 comprises a casing 153 which is secured in any desired manner to the fixed part 145 of the truck and which is provided with a chamber 154 which is closed at its lower end by a cap nut 155 having a screw threaded connection with the casing.

The lower end of the strut rod 146 is provided with an enlarged portion 156 which is contained in chamber 154 and which is provided with a bottom convex bearing surface 157 made in the form of a portion of a sphere and is further provided with a top convex bearing surface 158 which, from the smaller diameter of the rod is in the form of a portion of a sphere. The bottom surface 157 slidably engages a correspondingly shaped concave bearing surface provided on the upper side of a vertically movable bearing member 159 contained in the chamber 154 and supported on a spring 160 which is seated on the cap nut 155. The bearing member 159 is provided with a downwardly depending stem 159a which extends through a central opening in the nut 155 and which, exteriorly of the casing, is provided with a nut 161 which engages the casing to limit upward movement of the bearing member as shown in Fig. 1, and is further provided with a check nut 162 for preventing accidental rotation of the nut 161. The top bearing surface 158 slidably engages a correspondingly shaped concave bearing surface provided on the lower side of a vertically movable annular bearing member 163. Interposed between and engaging the member 163 and the top wall of the casing is a spring 164 which at all times exerts a downwardly directed pressure on the member. Integral with the bearing member 163 and extending upwardly therefrom and surrounding the strut rod is a sleeve 165 in which the central bore, accommodating the strut rod is of considerably greater diameter than that of the rod. The upper end of the sleeve extends through an opening in the casing and is provided with a nut 166 which is adapted to engage the casing and thereby limit downward movement of the bearing member 163 relative to the casing, which nut is maintained against accidental rotation by a check nut 167.

It will here be noted that the large portion 156 of the strut rod and the bearing members 159 and 163 cooperate to form a universal joint whereby free swiveling movement between the fixed part of the truck and the strut rod are permitted for purposes which will be hereinafter more fully described. In this connection it will be understood that the diameter of the central bore in the sleeve 165 is great enough that the sleeve will not interfere with such movement.

By limiting the vertical movement of the bearing members 159 and 163, the pressure thereof on the enlarged portion 156 of the strut rod 147 may be kept at a minimum thereby rendering the universal joint between the fixed part of the truck and the strut rod freely movable. If for any reason it should be desired to have both members 159 and 163 moved vertically with the strut rod the nuts 161, 162, 166 and 167 may be slacked back to provide a sufficient clearance between the nuts 161 and 166 and the casing to accommodate the maximum vertical movement of the strut rod.

*Operation*

Assuming both the water and fuel compartments to be lightly loaded the cylinder mechanism 54 and consequently the fulcrum member 51 will be in the position in which they are shown in Fig. 1. In this position the surfaces 79 and 80 of the jaw members 72 and 73, respectively, are spaced the same distance from the outer surface of the stop 149, and the lever 53 and the fulcrum member 51 are in their extreme position toward the left hand.

If when the several parts of the apparatus are in the positions just described, the distributing valve device 10 on the locomotive is caused to operate to effect an application of the brakes, fluid under pressure supplied by the application portion 16 to the brake cylinder pipe 12 flows to the locomotive brake cylinder 11 and to the pipe 14 on the tender and from thence flows to the diaphragm chamber 27 and valve chamber 34 of the control valve device 2. Fluid under pressure thus supplied to the chamber 27 causes the diaphragm 23 to flex upwardly which in turn causes the beam 41 to tilt in a clockwise direction about the fulcrum member 51 against the opposing pressure of a spring 175 interposed between and engaging the lever and the casing 20. As the lever is thus tilting it permits the spring 47 to act to seat the brake cylinder exhaust valve 45 and causes the diaphragm 24 to flex downwardly into engagement with the end of the fluted stem 36 of the supply valve 35 and thus unseats the supply valve against the opposing pressure of the spring 37. With the supply valve unseated fluid under pressure flows from the supply valve chamber 34 past the fluted stem 36 of the valve through diaphragm chamber 30, passage 31 and passage and pipe 32 of the tender brake cylinder 1.

Now when the pressure of fluid in diaphragm chamber 30 and acting on the small diaphragm 24 together with the pressure of spring 37 and 175 becomes slightly greater than that required to balance the force of the diaphragm 23 acting through the lever 41, the diaphragm will flex upwardly permitting the supply valve 35 to seat, the valve as it is thus closed cutting off the further flow of fluid under pressure to the diaphragm chamber 30 and consequently to the tender brake cylinder. With the flow of fluid to the chamber 30 cut off the upward flexing of the diaphragm 24 ceases and the lever 41 comes to a stop before it engages the stem of the release valve 45 so that the release valve will remain seated.

Now if the engineer should cause the locomotive brake cylinder pressure to be decreased, a corresponding decrease in the pressure of fluid in diaphragm chamber 27 will be effected. When this occurs the pressure of fluid in diaphragm chamber 30 will cause the diaphragm 24 to move upwardly and tilt the lever 41 about the fulcrum 51 a sufficient distance in a counterclockwise direction to unseat the release valve 45. With the valve 45 unseated, fluid under pressure is vented from the tender brake cylinder 1 to the atmosphere by way of pipe and passage 32, exhaust valve chamber 43 and past the unseated exhaust valve and its fluted stem, and since the diaphragm chamber 30 is connected through passage 31 to passage 32 fluid under pressure will also be vented from this chamber. When the pressure of fluid in chamber 30 has been reduced to slightly below the opposing force of the diaphragm 23 acting through the medium of the lever 41, the diaphragm 23 will act to tilt the lever 41 in a clockwise direction about the fulcrum member 51 permitting the spring 47 to seat the valve 45 and cut off the further flow of fluid under pressure from the tender brake cylinder and diaphragm chamber 30. With the flow of fluid thus cut off the diaphragm 24 will promptly come to a stop without unseating the supply valve 35. From this it will be seen that when the locomotive brake cylinder pressure is reduced the control valve device 2 will operate automatically to effect a proportionate reduction in tender brake cylinder pressure.

Assuming now that both the water and fuel compartments are fully loaded, the float 133 of the switch device 4 will be in its uppermost position in which the upper surface stops against the portion 122.

When the tender is thus loaded, the body thereof, control valve device 2 and adjusting mechanism 3 will be in their lowermost position with respect to the strut device 5 in which position the surface 79 of the jaw member 72 will be closer to the stop 149 than the surface 80 of the jaw member 73. If desired the surface 79 may engage the stop 79 when the tender is heavily loaded.

With the float in its uppermost position the contact rollers 137 and 138 each engage a contact point 136 of the member 135 so that the circuit through the battery 115 and the winding of the magnet valve device is closed and the winding is energized and as a result of such energization the double seating valve member 103 is shifted to its lower position in which the valve 103 is seated closing communication from the chamber 112 and pipe 13, which are in communication with the main reservoir 7 on the locomotive, to the timing reservoir 106, and in which the valve 107 is unseated. With the valve 107 unseated, fluid under pressure flows from the timing reservoir 106 to the piston chamber 96 of the locking mechanism by way of pipe and passage 105, valve chamber 104, past the unseated valve 107 and its fluted stem 109, chamber 111 and passages and pipe 97, causing the piston 95 to move toward the right hand, as viewed in Fig. 4, against the opposing pressure of the spring 100. The piston as it initially moves shifts the locking member in the same direction out of locking engagement with the lever 53 and then uncovers the passage 63 to the piston chamber 96. Fluid under pressure now flows from chamber 96 to the piston chamber 60 of the cylinder device 54 by way of passage and pipe 63, flexible conduit 62 and passage 61.

Fluid under pressure thus supplied to the piston chamber 60 causes the piston 59, piston stem 66, ears 67 thereof and rollers 74 carried by the ears, to move outwardly against the opposing pressure of the spring 65. As the rollers are thus moved they cooperate with the inclined surfaces 81 and 82 to force the jaw members 72 and 73 toward each other and consequently toward the stop 149. The surface 79 of the jaw member 72 is closest to the stop 149 so that it will engage the stop before the surface 80 of the jaw member 73 is permitted to do so. In view of this and to the fact that the strut device is maintained against downward movement by the spring supported bearing 159 the inclined surface 81 cooperates with the upper roller 74, as the roller travels upwardly thereon, to cause the outer end of the piston to move upwardly, thus rocking the cylinder device 54 in a clockwise direction about its trunnions 68 and 70. The lever 53, being secured to the trunnion 68, will rock with the cylinder mechanism and move the fulcrum member 51 along the lever 41 in the direction toward the right hand as viewed in Fig. 1.

As the bottom roller 74 travels along the inclined surface 82 of the jaw member 73 this jaw member will move upwardly, against the opposing pressure of the spring 77, toward the stop 149 of the strut device while the jaw member 72 still remains stationary. Now when the surface 80 of the jaw member 73 engages the stop 149 the clockwise rocking movement of the cylinder mechanism will cease and the fulcrum member 51 will be in its full load adjusted position. With the fulcrum member in this position, the lever 53 is in such a position that the left hand end of the locking surface thereon will be in alignment with the locking surface of the member 95.

At the same time as fluid is being supplied to the chamber 111 in the magnet valve device and piston chambers 96 and 60 it is being vented from the chambers and timing reservoir 106 to the atmosphere by way of the restricted passage 114 leading from the chamber 111 to the atmosphere. Shortly after the fulcrum member 51 has been moved to its proper adjusted position, the timing reservoir pressure will have been reduced to such an extent that the spring 100 will cause the piston 92 to move to its extreme left hand position as shown in Fig. 4. As the piston moves to this position it moves the locking member into locking engagement with the lever 53 and connects the piston chamber 60 of the cylinder mechanism 54 to the spring chamber 99 which is connected through passage 99a to the atmosphere. With the piston chamber 60 thus vented any fluid under pressure in piston chamber 60 remaining in chamber 60 is now permitted to flow to atmosphere.

With the chamber 60 thus vented, the spring 65 of the cylinder mechanism 54 will cause the piston 59 and thereby the piston stem and rollers 74 to move inwardly to their normal position as shown in Fig. 1. As the rollers are thus moved the spring 77 forces the jaw members 72 and 73 apart out of engagement with the stop 149 of the strut device 5. When the rollers have been moved to their normal position the surfaces 79 and 80 of the jaw members 72 and 73, respectively, will be equally spaced from the stop 149.

It will here be understood that the flow area of the choke 114 and the volume of the timing reservoir 106 are such as to insure the full adjustment of the apparatus before it is locked in its adjusted position.

While the jaw members 72 and 73 are in engagement with the stop 149 of the strut device 5, the dash-pot device 82 will hold the cylinder mechanism 54 against accidental rocking relative to the casing 26 upon momentary vertical movements or vibrations of the body relative to the truck. Since the cylinder mechanism 54 will be held against rocking, the strut device will yield and compensate for the momentary movement of the body, thus effectively guarding the cylinder mechanism and locking mechanism against undue strain.

Since the fulcrum device 51 is now positioned further toward the right hand end of the lever 41 than when the tender was lightly loaded it will require a greater brake cylinder pressure in diaphragm chamber 30 and acting on the diaphragm 24 to balance the opposing pressures of the fluid in diaphragm chamber 27 acting on diaphragm 24 through the medium of the diaphragm 23, follower 39, lever 41 and follower 43. From this it will be seen that the brake cylinder pressure obtained with the tender loaded will be much greater than with the tenders lightly loaded.

As the weight of the water and fuel decreases the body of the tender and the several parts of the brake equipment carried thereby will move upwardly relative to the strut device 5. This causes the surface 80 of the jaw member 73 to move toward the stop 149 and the surface 81 of the jaw member 72 to move away from the stop member.

When the level of the water drops the float 133 of the switch device, which drops with the water and which is held against rotary movement by the guide lugs 129, cooperates with the spiral portion 132 of the member 130 to rotate the member and thereby the members 135 and 141. Since the contact rollers 137 and 138 of the device are each in a recess 143 of the member 141 the float will not immediately cause the member 130 to move due to the resistance of the springs 139 and 140 to bending by the projections 142, but as the water recedes with relation to the float and before the water clears the bottom of the float this resistance is overcome and the member 130 and consequently the members 135 and 141 will rotate a short distance with a snap like action and the contact rollers will each engage a contact point 136 of the member 135. This snap like action is to prevent excessive arcing when the contact rollers are moved into or out of contact with the contact points 136.

When, as just described, the contact points are moved out of contact with the contact rollers, the circuit through the battery 115 and winding of the magnet valve device is open and as a result the magnet winding is deenergized, so that the spring 113 of the magnet valve device now acts to move the valve member 30 upwardly to the position in which it is shown in Fig. 1. In this position the valve 107 is seated and the valve 108 is unseated. With the valve 108 unseated fluid under pressure at main reservoir pressure flows from chamber 112, past the fluted stem 110 of the valve member to the chamber 104 and from thence flows through passage and pipe 105 to the timing reservoir 107, thus charging the reservoir preparatory to another adjustment of the apparatus.

Now when the next pair of contact points 136 are moved into contact with the contact rollers, the circuit through the battery and winding of the magnet valve device is closed and as a result the magnet winding is energized, so that the valve member is moved to its lower position in which the valve 107 is unseated and the valve 108 is unseated.

With the valve member 103 in this position the lock controlling piston 92 and the adjusting piston 60 will move outwardly as before described.

Since the surface 80 of the jaw member 73 is located closer to the stop 149 of the strut device than is the surface 79 of the jaw member 72, it will engage the stop 149 first, so that the inclined surface 82 of the jaw member 73 and the bottom roller 74 cooperate to cause the cylinder mechanism 54 and consequently the lever 53 to rock about the trunnions 68 and 70 in a counterclockwise direction until brought to a stop by the engagement of the jaw member 72 with the stop 149. The lever 53 as it is thus moved draws the fulcrum member 51 along the lever 41 in a direction toward the left hand. The several parts of the apparatus now move back to their normal position in the same manner as before described.

With the fulcrum member 51 thus positioned the brake cylinder pressure obtainable will of course be less than when the tender was fully loaded for the reason that the fulcrum is now located to the left of its former full load position.

Since the fulcrum member 51 is now positioned to the left of its former full load position the pressure of fluid required in diaphragm chamber 30 and brake cylinder 1 to cause the supply valve 35 to seat will be less than when the fulcrum member was in its full load position.

As the level of the water continues to fall, the switch device operates automatically to periodically open and close the circuit through the battery 115 and magnet winding. From this it will be understood that brake equipment will be conditioned at frequent intervals so that the braking power obtainable on the tenders will be varied according to relatively slight variations in the total weight of the water and fuel carried.

During a long run the water compartment of the tender may be refilled several times to one filling of the fuel compartment. Each time the water compartment is refilled the body of the tender will move downwardly relative to the strut device 5 a distance commensurate with the increase in the weight of the load carried, and since the float 133 moves upwardly with the level of the water, the brake equipment will be adjusted or conditioned to provide the desired braking power for the total weight of the load carried by the body of the tender.

It will be noted that since the float containing chamber of the control switch casing is in communication with the water compartment only through the passage 121 of small diameter surges in the water surrounding the casing cannot be transmitted to the chamber so that the float 133 and rotatable member 130 are well guarded against damage or unnecessary operation by such surges.

When, in releasing the brakes, the locomotive brake cylinder pressure present in diaphragm chamber 27 is being reduced by way of pipe 14, pipe 12 and distributing valve device 10, the pressure of fluid in diaphragm chamber 30 together with the pressure of the spring 175 will cause the lever 41 to rock in a counterclockwise direction about the fulcrum member 51. As the lever is thus moved the arm 44 thereof engages the fluted stem of the exhaust valve 45 and shifts the valve to its unseated position as shown in Fig. 1, so that fluid under pressure is now vented from the tender brake cylinder to the atmosphere. The spring 175 maintains the lever 41 in this position so that the brake cylinder 1 remains connected to the atmosphere until another application of the brakes is effected.

It will here be understood that the universal joint construction between the strut rod 146 and the fixed part of the truck will permit the rod to freely adjust itself to the maximum permissible swivelling movements between the tender body and truck when the tender is negotiating a curve in the track, thus rendering the strut device 5 immune from damage due to such swivelling movements.

*Description of the apparatus shown in Figs. 8 to 10 inclusive*

This form of the apparatus is for the most part identical with that shown in Figs. 1 to 7, inclusive, the only difference being in the arrangement and construction of the several parts of the cylinder mechanism and therefore the following detailed description of the apparatus will be limited more or less to the cylinder mechanism and its relation to the other parts of the apparatus.

In Figs. 8 to 10 the cylinder mechanism is indicated by the reference character 201 and comprises a horizontally disposed rock shaft 202 which is journalled at each end in the casing 20. The right hand end of the shaft, as viewed in Fig. 9, is operatively secured to the operating arm 90 of the dash-pot device 82 by means of the key 91.

The shaft intermediate its ends bridges a chamber 203 with which the casing is provided, and is provided with a longitudinally extending through slot 204 in which there is disposed a pair of longitudinally extending upper toggle links 205 and a pair of lower toggle links 206 arranged in parallel relation to the links 205. The inner ends of the links 205 are pivotally connected together by means of a pin 208 and the inner ends of the links 206 are connected together in the same manner. The outer ends of the links which are arranged on the right hand side of the pivot pins 208, as viewed in Fig. 9, are pivotally mounted on a pin 209 which extends transversely of the slot 204 and which, in the present embodiment of the invention, is rigidly secured to the shaft. The outer ends of the other links 205 and 206 are pivotally mounted on a pin 210 which is slidably carried by the shaft within registering transverse openings 211 which are elongated in the direction of the length of the shaft.

Arranged at the left hand end of the shaft 202 and in axial alignment therewith is a piston 212 having a stem 213 which extends through a central bore in the shaft, and which, at its end, operatively engages the outer ends of the toggle links 205, and 206 located on the left hand side of the pivot pins 208 as viewed in Fig. 9. At one side of the piston is a chamber 214 which is connected to the passage 63, and at the other side of the piston is a chamber 215 which is connected through a passage 216 to the atmosphere.

In this form of the invention the lever 53 is formed integral with a sleeve 217 which surrounds and is secured to the left hand end portion of the shaft 202 by the pin 299. Surrounding and secured to the right hand end portion of the shaft by means of a key 218 is a sleeve 219. The sleeves 217 and 219 are provided with supporting arms 220 and 221 respectively, which extend outwardly at right angles to the axis of the shaft through an opening 222 in the casing and which are spaced apart in the direction of the length of the shaft. The outer ends of these arms support a pin 223 which extends through registering openings in the arms and which is secured to the lugs in any desired manner.

Interposed between the lugs 220 and 221 and pivotally mounted on the pin 223 are upper and lower jaw members 224 and 225, respectively. To the right of pin 223, as viewed in Fig. 8, the jaw members normally engage opposite sides of the shaft 202 as shown. These portions of the jaw members extend across the slot 204 in the shaft and are adapted to be operatively engaged by the inner ends of the toggle links 205 and 206 in the manner hereafter fully described. The inner ends of the jaw members have interposed therebetween and operatively secured thereto a spring 226 which acts to pull these ends toward each other and to normally maintain them in contact with the shaft 202. The outer end portions of the jaw members, i. e., those portions which are located on the left hand side of the pin 223, are adapted to cooperate with the stop 149 of the strut device 5 in substantially the same manner as the jaw members 72 and 73 of the first described form of the apparatus.

*Operation of the apparatus shown in Figs. 8 to 10 inclusive*

When the latching piston chamber 96 is supplied with fluid under pressure and the latching piston 92 has been moved thereby to uncover the passage 63 fluid under pressure flows therethrough to the piston chamber 214 and causes the piston 212 and thereby the piston stem 213 to move in a direction toward the right hand as viewed in Fig. 9. Now, since the end of the piston stem is in engagement with the adjacent longitudinally movable ends of the toggle links 205 and 206, the pairs of links will arch in opposite directions and force the inner ends of the jaw members in directions away from each other against the opposing force of the spring 226. This causes the outer ends of the jaw member to move toward each other and consequently toward the stop 149 of the strut device 5.

If the tender is heavily loaded the upper jaw member will engage the stop 149 before it is possible for the lower jaw member to do so and through the medium of the pin 223, arms 220 and 221 cause the sleeves 217 and 219, lever 53 and shaft 202 to rock in a clockwise direction until the lower jaw member 225 engages the stop. The lever as it is thus moved forcing the fulcrum member 51 to the right as viewed in Fig. 8. If the weight of the load on the tender has been decreased the lower jaw member 225 will engage the stop 149 first, so that the lever 53 will be rocked in a counterclockwise direction, and as a consequence, the fulcrum member 51 will be pulled toward the left. Thus the fulcrum member will be automatically positioned periodically to condition the control valve device 2 according to the weight of the load carried.

The control valve device 2 when thus conditioned for either light or heavy load braking, will operate in substantially the same manner as the corresponding valve device shown in Figs. 1 to 7, inclusive to apply and release the brakes.

*Description of the apparatus shown in Figs. 11 to 13 inclusive*

The apparatus shown in these figures is, for the most part, substantially identical with that shown in Figs. 1 to 7, inclusive, the only difference being in the arrangement and construction of the several parts of the cylinder mechanism, the latching mechanism therefore, the upper end of the strut device 5 and the omission of the lever 53. In view of this the following description of the apparatus will be limited more or less to these parts and their relationship to the other parts of the apparatus.

In this form of the invention the control valve device 2 and lever 41 are disposed vertically instead of horizontally and the cap 21 of the casing is provided with an exterior vertically disposed surface 250 which faces the strut device 5 and which is slidably engaged by a corresponding rear surface of a vertically movable cylinder mechanism 251, which surface is formed on laterally extending lugs 252 which extend longitudinally of and are integral with the cylinder casing 253 of the cylinder mechanism. The cylinder casing is provided with a rearwardly extending lug which extends through a slotted opening 255 in the cap 21 and which, within the opening, is guided by the cap. This lug is bifurcated and carried by the jaws thereof and extending across the space therebetween is a pin 256 on which is mounted the fulcrum member 51 for engagement with the lever 41, said fulcrum member being movable upwardly and downwardly longitudinally of the lever by the cylinder mechanism.

Resting on the surface 250 and secured to the cap 21 are spaced longitudinally extending guide plates 257 which overlap the lugs 251. These plates form guides for the cylinder casing and also serve to hold the cylinder casing against accidental separation from the cap.

Contained in the cylinder casing are vertically movable upper and lower pistons 258 and 259 respectively which, as shown in Fig. 11, are normally located intermediate the ends of the cylinder and are spaced a short distance apart. Between the piston is a chamber 260 which is connected through a passage 261, a flexible conduit 262 and passages 263 and 264 to the chamber 111 of the magnet valve device 82.

The upper piston 258 is provided with an upwardly extending piston stem 265 which passes through a central opening in the upper non-pressure head 266 of the cylinder and which at its end is provided with a head 267 adapted to engage with a laterally extending lug 268 of the strut device 5. Normally the underside of the head 267 engages with the upper non-pressure head of the cylinder to limit downward movement of the piston. Contained in the chamber 269 at the stem side of the piston and interposed between and engaging the piston 258 and the non-pressure head 266 is a return spring 270.

The lower piston 259 is provided with a downwardly extending piston stem 271 which extends through a central opening in the lower non-pressure head 272 of the cylinder and which at its end is provided with a head 273 adapted to engage a lateral extending lug 274 of the strut device 5. Normally the upper side of the head 274 engages the lower non-pressure head to limit upward movement of the piston. Contained in the chamber 275 and interposed between and engaging the piston 259 and non-pressure head 272 at the stem side of the piston is a return spring 276.

The piston chambers 269 and 275 are open to the atmosphere by way of the clearance space between the piston stem and the non-pressure head. The cylinder casing is provided with an outwardly extending lug 276 having an opening extending vertically therethrough through which a vertically disposed portion of the strut device 5 passes.

Extending downwardly from the lower end of the cylinder casing is an extension 278 having a longitudinally extending slot 279 provided therein. At each side of the slot the extension is provided with latch teeth 280 which are adapted to be engaged by a toothed latch member 281 carried by the outer end of the piston stem 282 of a piston 283 operatively mounted in the casing 26. The piston stem passes through the slot 279 and is adapted to move the latch member in a direction transversely of the line of travel of the extension into or out of locking engagement with the teeth 280. At one side of the piston is a chamber 284 which is connected directly to the passage 264 and at the opposite side is a chamber 285 which is connected through a passage 286 to the atmosphere and which contains a spring 287 which acts to normally maintain the latch member 281 in locking engagement with the latch teeth 280.

*Operation of the apparatus shown in Figs. 8 to 13 inclusive*

When the magnet valve device 85 is energized, fluid under pressure supplied to the chamber 111 will flow therefrom through passage 264 to the piston chamber 284 and cause the piston 283 therein to move to shift the latching member 281 out of locking engagement with the teeth 280 of the cylinder casing extension 278.

From the passage 264 fluid under pressure also flows through passage 263, conduit 262 and passage 261 to the chamber 260 between the pistons 258 and 259 of the cylinder mechanism. Fluid under pressure supplied to the chamber 260 causes the pistons 258 and 259 to move outwardly in opposite directions. Now if the tender is heavily loaded the head 273 on the piston stem 271 will engage and be stopped by the lug 274 of the strut device 5 while the piston 258 will continue to move upwardly until it has been brought to a stop in its uppermost position by the inner end of a sleeve integral with the non-pressure head 266 and having screw threaded connection with the cylinder casing. With the piston 58 in this position the head 267 of the stem 265 will not engage the lug 268 of the strut device 5. Now as the pressure continues to build up in chamber 260 and before such pressure is sufficient to move the cylinder casing upwardly, the pressure of fluid in piston chamber 284 will cause the piston 283 to operate to shift the latching member 281 out of locking engagement with the teeth 280 of the extension 278 against the opposing pressure of the spring 287 on the piston. As the pressure of fluid in chamber 260 continues to build up it acts on piston 258 to move the cylinder casing upwardly until the head 267 of the piston stem 265 engages the lug 268 of the strut device 5, at which time the piston 259 will be in engagement with the inner end of a sleeve of the lower non-pressure head 272. The cylinder casing as it is thus moved causes the fulcrum member 51 to be shifted upwardly along the lever 41.

If the tender is lightly loaded the space between the head 267 of the piston stem 265 and the lug 268 of the strut device 5 will be less than the space between the head 273 of the piston stem 271 and the lug 274 of the strut device so that the pistons will operate to cause the cylinder casing to be moved downwardly, the piston 283 acting to move the latching member 281 out of locking engagement with the teeth 280 of the extension 278 before the casing starts to move downwardly.

Now when the fulcrum member 51 has been moved to its proper position, and the pressure of fluid in piston chamber 284 has been reduced slightly by the flow of fluid therefrom to the atmosphere by way of passage 264, chamber 111 and restricted passage 114 in the magnet valve device 82, the spring 287 causes the piston to move in a direction toward the right hand to shift the latching member 281 into locking engagement with the teeth 280 of the extension 278, thus locking the cylinder casing in its adjusted position. As the pressure of fluid in chamber 260 continues to be reduced by flow through passage 261, conduit 262, passages 263 and 264, chamber 111 and restricted passage 114, the springs 270 and 276 act to return the pistons 258 and 259 respectively to their normal positions as shown.

From the foregoing description, it will be seen that the fulcrum member 51 will be automatically positioned periodically to condition the control valve device 2 according to the weight of the load carried.

The control valve device 2 when thus conditioned for either light or heavy load braking will operate in substantially the same manner as the corresponding valve device shown in Figs. 1 to 7 inclusive to apply and release the brakes.

*Description of the apparatus shown in Fig. 14*

This apparatus for the most part is identical with the apparatus shown in Figs. 1 to 7, the chief differences being in the cylinder mechanism, the form of the upper end of the strut and the connections from the cylinder mechanism to the fulcrum member 51. In view of this the following description will be limited more or less to these parts and their relationship with the other parts of the apparatus which are common to both forms.

In this form of the invention, the reference character 301 indicates the cylinder mechanism which may comprise a cylinder casing 302 which is slidably mounted in the casing 20 of the control valve device 2 to move upwardly or downwardly relative to the casing 20.

Mounted in the cylinder casing is a piston 303 having at one side a chamber 304 which is connected through a flexible conduit 305, a passage 306, and a passage 307 to the chamber 111 of the magnet valve device 82. At the other side of the piston is a chamber 308 which is connected through a passage 309 to the atmosphere and which contains a return spring 310. This spring is interposed between and engages the back of the piston and the non-pressure head of the cylinder.

The piston 303 is provided with stems 311 which extend through a central opening in the non-pressure head of the cylinder and at its outer end is provided with a cone or wedge shaped enlargement 312 which is adapted to extend into an opening 313 provided in the upper portion of the strut device 5, the upper end of this portion of the strut being guided between spaced rollers 314 mounted on pins 315 carried by the casing 20.

Pivotally connected to the cap 21 of the control valve device 2 is a bell crank lever 316 having its arm 317 operatively connected to the upper end of the cylinder casing and its other arm operatively connected to the link 52 which is adapted to operate the fulcrum member 51.

The lower end portion of the cylinder casing is provided with a longitudinally extending slot 319 and at each side of the slot is provided with latch teeth 320 which are adapted to be engaged by latch teeth provided on a latching member 321 carried by the piston stem 322 of a piston operatively mounted in the casing 20, the piston stem passing through the slot and the piston being operative to cause the piston stem to shift the latch member into and out of locking engagement with the teeth 320 of the cylinder casing.

At one side of the piston 323 is a chamber 324 which is directly connected to the passage 307 and at the other side of the piston is a chamber 325 which is connected through a passage 326 to the atmosphere and which contains a spring 327 which acts on the piston to normally maintain the latching member 321 in locking engagement with the teeth 320 of the cylinder casing.

In this form of the invention the dash-pot device 82 is located above the link 52 and the shaft 328 thereof for operating the arm 90 is operatively connected through an arm 329 to the link 52 as shown.

*Operation of the apparatus shown in Fig. 14*

When the magnet valve device 82 is energized, fluid under pressure flows from chamber 111 to passage 307 and consequently to the piston chamber 324 and through passage 306 and flexible conduit 305 to the piston chamber 304. Fluid under pressure supplied to chamber 304 causes the piston 303 to move to shift the member 312 in the direction toward the left hand. If the tender is heavily loaded the space between the member 312 and the adjacent edge of the opening 213 will be less than the space between the member and the opposite edge of the opening, so that the member will engage the lower edge first. Now as the pressure of fluid in piston chamber 304 is increased and before the pressure is sufficient to cause the member 312 to move the cylinder casing upwardly, the pressure of fluid in piston chamber 324 will be sufficient to overcome the opposing pressure of the spring 325 so that the piston 323 will move in a direction toward the left hand and shift the latching member 321 out of locking engagement with the teeth 320 of the cylinder casing. Now as the pressure of fluid in piston chamber 304 further increases the member 312 will be caused to move outwardly and as it is thus being moved will cause the cylinder casing to be moved upwardly. This causes the bell crank lever 316 to be rotated about its pivot in a clockwise direction so that the link 52 and fulcrum member 51 are moved in a direction toward the right hand.

If the tender is lightly loaded the space between the member 312 and the upper surface of the opening 313 will be less than that between the member and the lower edge of the opening so that when the piston shifts the member 312 outwardly the cylinder casing will be moved downwardly, and the bell crank lever 316 will be rocked in a counterclockwise direction causing the link 52 and fulcrum member 51 to be moved in a direction toward the left hand. The adjusting movement of the cylinder casing continues until the member 312 engages both the upper and lower edges of the opening 313 when as will be understood the casing comes to a stop.

Now as the pressure of fluid is vented from the piston chambers 324 and 304 the spring 325 acts to move the piston 323 to its locking position, following which the piston 303 moves to its normal position as shown in the drawings.

When the control valve device 2 has been thus conditioned according to the load on the tender it will function in substantially the same manner to effect an application and the release of the brakes as hereinbefore described in connection with the apparatus shown in Figs. 1 to 7 inclusive.

*General considerations*

From the foregoing description it will be seen that the control valve device of each form of the invention is adapted to be frequently conditioned according to variations in the weight of the water and fuel carried by the tenders through the operation of a mechanism which is automatically controlled according to the amount of water carried by the tender. By reason of this automatic control, the conditioning of the control valve device is accomplished either while the tender is either in motion or stationary, thus at all times insuring the proper adjustment of the braking power to compensate for relatively slight variations in the weight of the water and fuel carried.

In the present embodiment of the invention the locomotive and tender brake equipments are directly connected to each other, but it will be understood that the automatic adjustment of the tender brake equipment according to variations in the weight of the load carried by the tender, will in no way affect the usual control of the locomotive brake equipment.

If it should be desired to brake each truck of the tender according to the weight of the load carried thereby instead of braking both trucks according to the weight of the load carried by one, two of my variable load brake equipments may be employed. When this arrangement is used it will be apparent that only one switch device 4 need be employed for controlling the operation of both of the magnet valve devices 98.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a variable load brake equipment for a vehicle in which the body thereof is adapted to carry at the same time a plurality of kinds of lading and in which the weight of each kind of lading is adapted to be reduced while the vehicle is in transit, in combination, control means adapted to be automatically conditioned to operate to provide different degrees of braking depending upon the weight of the load carried by the vehicle, and means controlled by one of said kinds of lading for conditioning said control means.

2. In a variable load brake equipment for a vehicle in which the body thereof is adapted to carry at the same time a plurality of kinds of lading and in which the weight of each kind of lading is adapted to be reduced while the vehicle is in transit, in combination, control means adapted to be automatically conditioned to operate to provide different degrees of braking depending upon the weight of the load carried by the vehicle, control means operative to vary the degree of braking according to variations in the weight of the load carried by the vehicle, and means controlled according to a variation in the amount of one kind of lading for rendering said control means operative.

3. In a variable load brake equipment for a vehicle in which the body thereof is adapted to carry at the same time a plurality of kinds of lading and in which the weight of each kind of lading is adapted to be reduced while the vehicle is in transit, in combination, control means adapted to be automatically conditioned to operate to provide different degrees of braking depending upon the weight of the load carried by the vehicle, control means operative to vary the degree of braking according to variations in the weight of the load carried by the vehicle, and means controlled according to a variation in the amount of one kind of lading for rendering said control means operative or non-operative.

4. In a variable load brake equipment for a vehicle in which the body thereof is adapted to carry at the same time a plurality of kinds of lading and in which the weight of each kind of lading is adapted to be reduced while the vehicle is in transit, in combination, control means adapted to be automatically conditioned to operate to provide different degrees of braking depending upon the weight of the load carried by the vehicle, control means operative to vary the degree of braking according to variations in the weight of the load carried by the vehicle, mechanism for rendering said control means operative or non-operative, and means controlled according to variations in the amount of one kind of lading for effecting the operation of said mechanism.

5. In a variable load brake equipment for a vehicle in which the body thereof is adapted to carry at the same time a plurality of kinds of lading and in which the weight of each kind of lading is adapted to be reduced while the vehicle is in transit, in combination, control means adapted to be automatically conditioned to operate to provide different degrees of braking depending upon the weight of the load carried by the vehicle, means for conditioning said control means, and means controlled by one of said kinds of lading for effecting the operation of the conditioning means.

6. In a variable load brake equipment for a vehicle in which the body thereof is adapted to carry at the same time a plurality of kinds of lading and in which the weight of each kind of lading is adapted to be reduced while the vehicle is in transit, in combination, control means adapted to be automatically conditioned to operate to provide different degrees of braking depending upon the weight of the load carried by the vehicle, means for conditioning said control means, and means controlled according to variations in the amount of one of said kinds of lading for effecting the operation of the conditioning means.

7. In a variable load brake equipment for a vehicle in which the body thereof is adapted to carry at the same time a plurality of kinds of lading and in which the weight and amount of each kind of lading is adapted to be reduced while the vehicle is in transit, in combination, control means adapted to be automatically conditioned to operate to provide different degrees of braking depending upon the weight of the load carried by the vehicle, means operative to condition said control means, and means automatically controlled according to variations in the amount of one of said kinds of lading for periodically effecting the operation of the conditioning means.

8. In a variable load brake equipment for a vehicle in which the body thereof is adapted to carry at the same time a plurality of kinds of lading and in which the weight of each kind of lading is adapted to be reduced while the vehicle is in transit, in combination, control means for effecting an application of the brakes and adapted to be automatically conditioned to vary the braking power on the vehicle according to the weight of the load carried, and means operative according to variations in the amount of one of said kinds of lading for conditioning said control means.

9. In a variable load brake equipment for a vehicle in which the body thereof is adapted to carry at the same time a plurality of kinds of lading and in which the weight of each kind of lading is adapted to be reduced while the vehicle is in transit, in combination, control means adapted to be automatically conditioned to operate to provide different degrees of braking depending upon the weight of the load carried by the vehicle, mechanism operative to condition said control means, means for locking said mechanism in a conditioning position, and means operative by one of said kinds of lading for periodically effecting the operation of the locking means to unlock said mechanism, the operation of said mechanism to a conditioning position and the operation of the locking means to again lock the mechanism in the sequence specified.

10. In a variable load brake equipment for a locomotive tender, in combination, control means adapted to be conditioned to operate to control the braking power on the vehicle according to the weight of the water and fuel carried, and means controlled by variations in the amount of water carried for conditioning said control means.

11. In a variable load brake equipment for a locomotive tender, in combination, control means adapted to be automatically conditioned to provide different degrees of braking, mechanism operative according to the weight of the water and fuel carried for conditioning the control means, and means operative according to variations in the amount of water carried for effecting the operation of said mechanism.

12. In a variable load brake equipment for a locomotive tender, in combination, control means adapted to be conditioned to operate to control the braking power on the vehicle according to the weight of the water and fuel carried, mechanism operative to condition said control means, electrically controlled means operative periodically to effect the operation of said mechanism, and means operative by the water carried for effecting the operation of the electrically controlled means.

13. In a variable load brake equipment for a locomotive tender, in combination, control means adapted to be conditioned to operate to control the braking power on the vehicle according to the weight of the water and fuel carried, mechanism operative to condition said control means, electrically controlled means operative periodically to effect the operation of said mechanism, switch means operative to control said electrically controlled means, and means automatically controlled by the water carried for actuating said switch means.

14. In a variable load brake equipment for a locomotive tender, in combination, control means adapted to be conditioned to operate to control the braking power on the vehicle according to the weight of the water and fuel carried, mechanism operative to condition said control means, electrically controlled means operative periodically to effect the operation of said mechanism, switch means operative to control said electrically controlled means, and a float movable according to variations in the level of the water carried for actuating said switch means.

15. In a variable load brake equipment for a locomotive tender, in combination, a truck for said tender, a body for said tender movable vertically relative to the truck in response to variations in the weight of the water and fuel carried, a control device adapted to be automatically conditioned to provide different degrees of braking, mechanism operative according to relative vertical movement between said body and a fixed part of the truck for conditioning said control means, and means controlled by the water carried for effecting the operation of said mechanism.

16. In a variable load brake equipment for a locomotive tender, in combination, a body for said tender, a supporting truck for said body, a control device adapted to be conditioned to provide different degrees of braking, mechanism operative according to relative movement between said body and a fixed part of the truck under variations in the weight of the water and fuel carried by the body for conditioning said control means, and means operative according to variations in the level of the water carried for effecting the operation of said mechanism.

17. In a variable load brake equipment for a locomotive tender, in combination, a body for said tender, a supporting truck for said body, a control device carried by said body adapted to be automatically conditioned to provide different degrees of braking, mechanism carried by said body operative according to relative movement between said body and the fixed part of the truck under variations in the weight of water and fuel carried by the body for conditioning said control means and means located interiorly of the body and controlled by the water carried for effecting the operation of the said mechanism.

18. In a variable load brake equipment for a locomotive tender, in combination, a body for said tender, a supporting truck for said body, a strut device carried by a fixed part of the truck, a control device carried by said body adapted to be automatically conditioned to provide different degrees of braking, mechanism carried by said body operative according to relative movement between said body and strut under variations of the water and fuel carried by the body for conditioning said control means, and means controlled by the water carried for effecting the operation of said mechanism.

19. In a variable load brake equipment for a locomotive tender, in combination, a truck for said tender having a fixed part, a body for said tender mounted on said truck movable vertically relative to said fixed part in response to variations in the weight of the water and fuel carried by the body, a strut device carried by said fixed part of the truck, control means adapted to be conditioned according to variations in the position of the body relative to said strut to operate to provide different degrees of braking, and means controlled by the water carried for conditioning the control means.

20. In a variable load brake equipment for a locomotive tender, in combination, a truck for said tender having a fixed part, a body for said tender mounted on said truck and movable vertically relative to said fixed part in response to variations in the weight of the water and fuel carried by the body, a strut device carried by said fixed part of the truck, control means adapted to be conditioned to provide different degrees of braking, mechanism adapted to cooperate with said strut to condition said control means for operation to provide the degree of braking called for by the position of the body with relation to the strut, and means controlled by the water carried for effecting the operation of said mechanism to cooperate with said strut.

21. In a variable load brake equipment for a locomotive tender, in combination, a truck for said tender having a fixed part, a body for said tender mounted on said truck and movable vertically relative to said fixed part in response to variations in the weight of the water and fuel carried by the body, control means adapted to be conditioned to provide different degrees of braking, and mechanism operative according to the position of said body with relation with said fixed part of the truck and to the amount of water carried for conditioning said control means.

22. In a variable load brake equipment for a locomotive tender, in combination, a brake cylinder, a control valve device operative by fluid under pressure to either supply fluid under pressure to or release fluid under pressure from the brake cylinder, mechanism adapted to be operated by fluid under pressure to condition the control valve device to control the brake cylinder pressure according to the weight of the water and fuel carried, and means operative according to variations in the amount of water carried for supplying fluid under pressure to effect the operation of said mechanism.

23. In a variable load brake equipment for a locomotive tender, in combination, a brake cylinder, a control valve device operative by fluid under pressure to either supply fluid under pressure to or release fluid under pressure from the brake cylinder, mechanism adapted to be operated by fluid under pressure to condition the control valve device to control the brake cylinder pressure according to the weight of the water and fuel carried, valve means operative by fluid under pressure to effect the operation of said mechanism, and means operative according to variations in the amount of water carried for actuating said valve means.

24. In a variable load brake equipment for a locomotive tender, in combination, a brake cylinder, a control valve device operative by fluid under pressure to either supply fluid under pressure to or release fluid under pressure from the brake cylinder, mechanism adapted to be operated by fluid under pressure to condition the control valve device to control the brake cylinder pressure according to the weight of water and fuel carried, valve means operative to supply fluid under pressure to effect the operation of said mechanism, electrically controlled means for effecting the operation of said valve means, and switch means operative by the water carried for effecting the operation of the electrically controlled means.

25. In a variable load brake equipment for a locomotive tender, in combination, a brake controlling valve device adapted to be conditioned to provide different degrees of braking to compensate for variations in the weight of water and fuel carried, mechanism operative to condition the brake controlling valve device according to the weight of the water and fuel, and means controlled by the water for effecting the operation of said mechanism.

26. In a variable load brake equipment for railway rolling stock, in combination, a locomotive brake cylinder, a tender brake cylinder, a control valve device on the tender operative to supply fluid under pressure to the tender brake cylinder to effect an application of the tender brakes, means on the locomotive operative to supply fluid under pressure to the locomotive brake cylinder to effect an application of the locomotive brakes and to supply fluid under pressure to said control valve device to effect the operation thereof, mechanism operable for conditioning said control valve device according to the weight of the water and fuel carried by the tender to control the tender brake cylinder pressure, and means controlled by the water carried by the tender for effecting the operation of said mechanism.

27. In a variable load brake equipment for railway rolling stock, in combination, a locomotive brake cylinder, a tender brake cylinder, a control valve device from the tender operative to supply fluid under pressure to the tender brake cylinder to effect an application of the tender brakes, means on the locomotive to supply fluid under pressure to the locomotive brake cylinder to effect an application of the locomotive brakes and to supply fluid under pressure to effect the operation of said control valve device, mechanism conditioning said control valve device for operation to limit the tender brake cylinder pressure according to the weight of the water and fuel carried by the tender, and means controlled by the water carried by the tender for effecting the conditioning operation of said mechanism.

28. In a variable load brake mechanism for a locomotive tender, in combination, a truck for said tender having a fixed part, a body for said tender mounted on said truck to move vertically relative to said fixed part, a brake cylinder, a control valve device operative to supply fluid under pressure to the brake cylinder and adapted to be conditioned to limit said supply, a cylinder mechanism carried by said body adapted to cooperate with said fixed part of the truck to condition said control valve device according to the weight of the water and fuel carried, and means controlled by the water carried for effecting the operation of said cylinder mechanism.

29. In a variable load brake mechanism for a locomotive tender, in combination, a truck for said tender having a fixed part, a body for said tender mounted on said truck to move vertically relative to said fixed part in response to variations in the weight of the water and fuel carried, a brake cylinder, a control valve device carried by said body operative to supply fluid under pressure to the brake cylinder and adapted to be conditioned to limit said supply, a cylinder mechanism movably carried by said body adapted to be operated to engage said fixed part of the truck and to then propel itself to condition said control device according to the position of said body with relation to said fixed part of the truck, and means for effecting the operation of said cylinder mechanism.

30. In a variable load brake mechanism for a locomotive tender, in combination, a truck for said tender having a fixed part, a body for said tender mounted on said truck to move vertically relative to said fixed part under variations in the weight of the water and fuel carried, a brake cylinder, a control valve device carried by said body operative to supply fluid under pressure to the brake cylinder and adapted to be conditioned to limit said supply, a cylinder mechanism rockably carried by said body adapted to be operated to first engage the said fixed part of the truck and to then rock itself to condition said control device according to the position of said body with relation to said fixed part of the truck, and means for effecting the operation of said cylinder mechanism.

31. In a variable load brake mechanism for a locomotive tender, in combination, a truck for said tender having a fixed part, a body for said tender mounted on said truck to move vertically relative to said fixed part under variations in the weight of the water and fuel carried, a brake cylinder, a control valve device carried by said body operative to supply fluid under pressure to the brake cylinder and adapted to be conditioned to limit said supply, a cylinder mechanism rockably carried by said body and operative to condition said control valve device, said mechanism as it is operated being adapted to engage said fixed part of the truck, and means operative upon engagement of said mechanism with said fixed part of the truck for rocking said mechanism.

32. In a variable load brake mechanism for a locomotive tender, in combination, a truck for said tender having a fixed part, a body for said tender mounted on said truck to move vertically relative to said fixed part under variations in the weight of the water and fuel carried, a brake cylinder, a control valve device carried by said body operative to supply fluid under pressure to the brake cylinder and adapted to be conditioned to limit said supply, a vertically movable cylinder carried by said body adapted to be first operated to engage said fixed part of the truck and to then propel itself vertically to condition said control device, and means for effecting the operation of said cylinder mechanism.

33. In a variable load brake mechanism for a locomotive tender, in combination, a truck for said tender having a fixed part, a body for said tender mounted on said truck to move vertically relative to said fixed part under variations in the weight of the water and fuel carried, a brake cylinder, a control valve device carried by said body operative to supply fluid under pressure to the brake cylinder and adapted to be conditioned to limit said supply, a cylinder mechanism rockably carried by said body adapted to be operated to first engage said fixed part of the truck and to then rock itself to condition said control device according to the position of said body with relation to said fixed part of the truck, and means for effecting the operation of said cylinder mechanism.

34. In a variable load brake mechanism for a locomotive tender, in combination, a truck for said tender having a fixed part, a body for said tender mounted on said truck to move vertically relative to said fixed part under variations in the weight of the water and fuel carried, a brake cylinder, a control valve device carried by said body operative to supply fluid under pressure to the brake cylinder and adapted to be conditioned to limit said supply, a cylinder mechanism carried by said control valve device adapted to be operated to first engage said fixed part of the truck and to then shift itself to condition said control device according to the position of said body with relation to said fixed part of the truck, and means for effecting the operation of said cylinder mechanism.

35. In a variable load brake mechanism for a locomotive tender, in combination, a truck for said tender having a fixed part, a body for said tender mounted on said truck to move vertically relative to said fixed part in response to variations in the weight of the water and fuel carried, a brake cylinder, a control valve device operative to supply fluid under pressure to the brake cylinder and adapted to be conditioned to limit said supply, a cylinder mechanism actuable by fluid under pressure and according to the position of said body relative to said fixed part for conditioning said control valve device, and means operable according to variations in the amount of water carried for supplying fluid under pressure to actuate the cylinder mechanism.

36. In a variable load brake mechanism for a locomotive tender, in combination, a truck for said tender having a fixed part, a body for said tender mounted on said truck to move vertically relative to said fixed part in response to variations in the weight of water and fuel carried, a brake cylinder, a control valve device operative to supply fluid under pressure to the brake cylinder and adapted to be conditioned to limit said supply, said control valve device comprising a normally seated supply valve, a plurality of spaced movable abutments, a tiltable beam extending between and operatively connecting said movable abutments, a fulcrum about which the beam is adapted to tilt, one of said abutments being operable by fluid under pressure to actuate said lever to effect the unseating of said valve to admit fluid under pressure to said brake cylinder, and the other of said abutments being operable by fluid at brake cylinder pressure for actuating said beam to effect the seating of said valve, a cylinder mechanism adapted to cooperate with said fixed part of the truck to shift said fulcrum longitudinally of the beam, said cylinder mechanism being normally out of engagement with said fixed part of the truck and being movable relative thereto with the body in response to variations in the weight of the water and fuel carried and operable by fluid under pressure into engagement with the fixed part to effect the positioning of said fulcrum, and means controlled by the water carried for effecting the operation of said cylinder mechanism.

37. In a variable load brake mechanism for a locomotive tender, in combination, a truck for said tender having a fixed part, a body for said tender mounted on said truck to move vertically relative to said fixed part in response to variations in the weight of water and fuel carried, a brake cylinder, a control valve device operative to supply fluid under pressure to the brake cylinder and adapted to be conditioned to limit said supply, said control valve device comprising a normally seated supply valve, a plurality of spaced movable abutments, a tiltable beam extending between and operatively connecting said movable abutments, a fulcrum about which the beam is adapted to tilt, one of said abutments being operable by fluid under pressure to actuate said lever to effect the unseating of said valve to admit fluid under pressure to said brake cylinder, and the other of said abutments being operable by fluid at brake cylinder pressure for actuating said beam to effect the seating of said valve, a cylinder mechanism adapted to cooperate with said fixed part of the truck to shift said fulcrum longitudinally of the beam, said cylinder mechanism being normally out of engagement with said fixed part of the truck and being movable relative thereto with the body in response to variations in the weight of the water and fuel carried and operable by fluid under pressure into engagement with said fixed part of the truck to effect the positioning of said fulcrum, means for locking the cylinder mechanism and fulcrum in their adjusted position and for then causing the cylinder mechanism to free itself from said fixed part, and means controlled by the water carried for effecting the operation of said cylinder mechanism and locking means.

38. In a variable load brake mechanism for a locomotive tender, in combination, a truck for said tender having a fixed part, a body for said tender mounted on said truck to move vertically relative to said fixed part in response to variations in the weight of the water and fuel carried, a brake cylinder, a control valve device operative to supply fluid under pressure to the brake cylinder and adapted to be conditioned to limit said supply, said control valve device comprising a normally seated supply valve, a plurality of spaced movable abutments, a tiltable beam extending between and operatively connecting said movable abutments, a fulcrum about which the beam is adapted to tilt, one of said abutments being operable by fluid under pressure to actuate said lever to effect the unseating of said valve to admit fluid under pressure to said brake cylinder, and the other of said abutments being operable by fluid at brake cylinder pressure for actuating said beam to effect the seating of said valve, a cylinder mechanism adapted to cooperate with said fixed part of the truck to shift said fulcrum longitudinally of the beam, said cylinder mechanism being normally out of engagement with said fixed part of the truck and being movable relative thereto with the body in response to variations in the weight of the water and fuel carried and operable by fluid under pressure into engagement therewith to effect the positioning of said fulcrum, means locking said cylinder mechanism out of engagement with said fixed part and operable by fluid under pressure to first unlock the cylinder mechanism and to then supply fluid under pressure to actuate the cylinder mechanism, and means controlled by the water carried for supplying fluid under pressure to effect the operation of the locking means and thereby the operation of the cylinder mechanism.

39. In a variable load brake mechanism for a locomotive tender, in combination, a truck for said tender having a fixed part, a body for said tender mounted on said truck to move vertically relative to said fixed part in response to variations in the weight of the water and fuel carried, a brake cylinder, a control valve device operative to supply fluid under pressure to the brake cylinder and adapted to be conditioned to limit said supply, said control valve device comprising a normally seated supply valve, a plurality of spaced movable abutments, a tiltable beam extending between and operatively connecting said movable abutment, a fulcrum about which the beam is adapted to tilt, one of said abutments being operable by fluid under pressure to actuate said lever to effect the unseating of said valve to admit fluid under pressure to the brake cylinder and the other of said abutments being operable by fluid at brake cylinder pressure for actuating said beam to effect the seating of said valve, a cylinder mechanism adapted to cooperate with said fixed part of the truck to shift said fulcrum longitudinally of the beam, said cylinder mechanism being normally out of engagement with said fixed part of the truck and being movable relative thereto with the body in response to variations in the weight of the water and fuel carried and operable by fluid under pressure into engagement with the fixed part of the truck to effect the positioning of said fulcrum, means controlled by the water carried for supplying fluid under pressure to effect the operation of the locking means and thereby the operation of the cylinder mechanism, and means for effecting the operation of the locking means to its locking position at a predetermined time after the initiation of the unlocking operation, said locking means in its unlocking movement effecting the operation of the cylinder mechanism to free itself from said fixed part of the truck.

40. In a variable load equipment for a locomotive tender, in combination, a brake cylinder, a control valve device for controlling the supply of fluid under pressure to and the exhaust of fluid under pressure from said brake cylinder, said control valve device comprising a normally seated supply valve and a normally unseated exhaust valve, a plurality of fluid pressure responsive abutments, a tiltable beam controlled by said abutments for actuating said valve, a movable fulcrum for said beam adapted to be shifted from one position to another along the beam according to variations in the weight of the water and fuel carried, one of said abutments being operable by fluid under pressure to actuate said beam to unseat said supply valve to admit fluid under pressure to the brake cylinder and the other of said abutments being operative thereafter to operate said beam to effect the seating of the supply valve, said other abutment being operative when the brake cylinder pressure exceeds the pressure of fluid acting on the first mentioned abutment to actuate said beam to unseat said exhaust valve to release fluid under pressure from the brake cylinder, fluid pressure responsive means operative to shift said fulcrum, and means controlled by the water carried for supplying fluid under pressure for actuating said fluid pressure responsive means.

41. In a variable load brake equipment for a vehicle in which the body thereof is adapted to carry at the same time a plurality of kinds of lading and in which the weight of each kind of lading is adapted to be reduced while the vehicle is in transit, in combination, control means adapted to be automatically conditioned to operate to provide different degrees of braking depending upon the weight of the load carried by the vehicle, mechanism operative to condition said control means, a device normally locking said mechanism against operation and being operable to first unlock the mechanism and to then effect the operation of the mechanism, and means controlled by one of said kinds of lading for effecting the operation of the locking device.

42. In a variable load brake equipment for a vehicle in which the body thereof is adapted to carry at the same time a plurality of kinds of lading and in which the weight of each kind of lading is adapted to be reduced while the vehicle is in transit, in combination, control means adapted to be automatically conditioned to operate to provide different degrees of braking depending upon the weight of the load carried by the vehicle, mechanism operative to condition said control means, a device normally locking said mechanism against operation and being operable to first unlock the mechanism to then effect the operation of the mechanism and to finally lock the mechanism in its conditioning position, and means controlled by one of said kinds of lading for initiating the operation of the locking device.

43. In a variable load brake equipment for a vehicle in which the body thereof is adapted to carry at the same time a plurality of kinds of lading and in which the weight of each kind of lading is adapted to be reduced while the vehicle is in transit, in combination, control means adapted to be automatically conditioned to operate to provide different degrees of braking depending upon the weight of the load carried by the vehicle, mechanism operative to condition said control means, a device normally locking said mechanism against operation and being operable to first unlock the mechanism to then effect the operation of the mechanism and to finally lock the mechanism in its conditioning position, means for delaying the locking action of the locking device for a period of time sufficient to insure the full conditioning action of said mechanism, and means controlled by one of said kinds of lading for initiating the operation of the locking device.

44. In a variable load brake equipment for a locomotive tender, in combination, a body for said tender, a supporting truck for said body, a control device adapted to be conditioned to provide different degrees of braking, mechanism operative according to relative movement between said body and a fixed part of the truck under variations in the weight of the water and fuel carried by the body for conditioning said control means, means adapted to restrain momentary relative vertical movement between said body and fixed part of the truck, from affecting the conditioning action of said mechanism, and means operative according to variations in the amount of water carried for effecting the operation of said mechanism.

45. In a variable load brake equipment for a locomotive tender, in combination, a body for said tender, a supporting truck for said body, a control device adapted to be conditioned to provide different degrees of braking, mechanism operative according to relative movement between said body and a fixed part of the truck under variations in the weight of the water and fuel carried by the body for conditioning said control means, means adapted to restrain momentary relative vertical movement between said body and fixed part of the truck, from affecting the conditioning action of said mechanism, means carried by said fixed part of the truck for cushioning shocks imposed upon said mechanism when said means acts to restrain said momentary vertical movement between the body and fixed part of the truck, and means operative according to variations in the amount of water carried for effecting the operation of said mechanism.

46. In a variable load brake equipment for a vehicle, in combination, a truck for the vehicle having a fixed part, a body mounted on said truck to move vertically relative to said fixed part of the truck, a vertically disposed strut mounted on said fixed part of the truck, means interposed between and cooperating with said strut and fixed part of the truck to yieldably oppose vertical movement between said strut and fixed part, a control device adapted to be conditioned to provide different degrees of braking, mechanism carried by said body adapted to be moved into engagement with said strut and, when in engagement, to cooperate with the strut to propel itself to condition the control means, means for restraining said mechanism against movement by rapid or momentary vertical movements between the body and fixed part of the truck, the restraining means being adapted to freely yield to a slower steady vertical movement of the body relative to the fixed part of the truck to permit the movement of said mechanism, said strut when said mechanism is in engagement therewith and the restraining means operates to restrain movement of the mechanism yielding to the movement of the mechanism relative to the fixed part of the truck, and means operated according to variations in the amount of the load carried for effecting the operation of said mechanism.

CLYDE C. FARMER.